UNITED STATES PATENT OFFICE 2,567,026

BICYCLOOCTANE ACETIC ACID AND ESTERS THEREOF

Earl L. Pelton, Glenn C. Wiggins, and Gerald M. Corbett, Midland, Mich., assignors to The Dow Chemical Company, Midland, Mich., a corporation of Delaware No Drawing. Application April 2, 1949, Serial No. 85,271

6 Claims. (Cl. 260—468)

This invention relates to a presumed bicyclooctane acetic acid, to its esters, and to a method for its production.

This new acid, useful as an intermediate in the preparation of new germicides and fungicides and agricultural chemicals is obtained, according to the present invention, by the oxidation of hydroxy - tetrahydro - nor-dicyclopentadiene with fused caustic alkali at 275°–375° C. It has been reported (Bruson, J. Amer. Chem. Soc. 67, 723-8 (1945)) that the oxidation of hydroxy-tetrahydro-nor-dicyclopentadiene, with nitric acid, gives a dicarboxylic acid, $C_{10}H_{14}O_4$, whose formula is postulated as being:

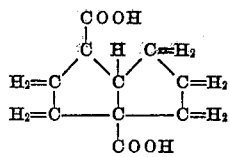

It has now been found that, instead of yielding the acid $C_{10}H_{14}O_4$, the oxidation of the same alcohol with fused caustic alkali yields a mixture of two isomeric monobasic acids whose empirical formula is $C_{10}H_{16}O_2$. The equation for this reaction, and the probable formula of the principal and crystalline acid $C_{10}H_{16}O_2$ are given below:

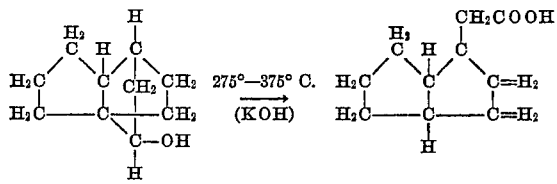

The following example illustrates the preparation of the new acid:

An approximately equimolecular mixture of potassium and sodium hydroxides, weighing 1000 grams, was placed in a nickel pot, 6 inches in diameter and 9 inches deep. The pot was provided with a stirrer and a tight fitting cover having an inlet for supplying the alcohol to the reaction zone and an outlet for hydrogen and any generated vapors. The alkali mixture was heated to 300° C. and 515 grams (3.38 moles) of hydroxy - tetrahydro - nor-dicyclopentadiene was added dropwise over the course of 5 hours, while the mixture was stirred. Hydrogen was evolved, but little organic matter vaporized from the reaction vessel. The melt was quite fluid at 300° C., and had the consistency of a soft soap. On cooling, it froze to a brittle cake which was dissolved in about 6 liters of water. The solution was filtered and then acidified with aqueous hydrochloric acid. A viscous, light brown oil separated from and floated on the resulting brine. The oil was thinned with toluene, filtered, separated from the water layer, and distilled. After the toluene had been recovered, substantially all of the reaction product distilled at or near 160° C. at 14 to 15 millimeters of mercury, absolute pressure. The distillate was a colorless liquid which froze at 36° C., forming a mush of white crystals, gradually turning to a solid mass. On recrystallization from acetone, the crystals had a melting point of 49.3°–49.5° C. The crystals were found to have a neutralization equivalent and a molecular weight of 168, and analysis showed the empirical formula to be $C_{10}H_{16}O_2$. Past experience with the fused caustic oxidation of saturated cyclic alcohols leads to the belief that scission of the alcohol occurred at the point indicated by the dotted line in the formula, above, and that the acid may prove to be 1-(3,3,0-bicyclooctane)-acetic acid. The new acid forms an amide melting at 166.3°–167° C., and a paranitrobenzyl ester melting at 52.3°–52.6° C.

The new acid has been illustated as being formed by fusion of the parent alcohol with an equimolar mixture of sodium and potassium hydroxides at 300° C. Either of the alkali metal hydroxides may be used alone, or mixed with sodium or potassium acetate, or in mixtures of the two alkalies, with or without an acetate, in the manner illustrated, for example, in prior Patents 1,961,623 (Earl L. Pelton) and 2,425,343 (Earl L. Pelton and Andrew A. Holzschuh), and at a temperature between 275° and 375° C. at which the nearly anhydrous alkali employed exists in a fused condition.

In preliminary tests of bactericidal and fungicidal activity of the presumed bicyclooctane-acetic acid, it was found to inhibit growth of *Staphylococcus aureus*, *Eberthella typhosa*, *Aspergillus niger*, and *Chaetomium globosum* in a saturated agar streak test.

The acid $C_{10}H_{16}O_2$ has been esterified to produce a variety of useful esters whose preparation may be illustrated by the following example:

There was mixed together 407 grams (5.5 moles) of isobutyl alcohol, 845 grams (5 moles) of the above-described new acid, 25 grams of p-toluene sulfonic acid, and 1 liter of methyl cyclohexane. The mixture was heated to its boiling point, at which an azeotropic mixture of water and methyl cyclohexane was driven off. When the reaction was complete, the new isobutyl ester was distilled. In similar manner, esters have been made from the new acid and methyl alcohol, ethyl alcohol and from dipropylene glycol monomethyl ether. The properties of these esters are:

| Ester of $C_{10}H_{16}O_2$ | Methyl | Ethyl | Isobutyl | Methoxy propoxy propyl |
|---|---|---|---|---|
| Boiling Point, °C | 102/10 mm | 109/8 mm | 245/462 mm 118/4.5 mm | 163/3 mm |
| Density at 25° C | 0.990 | 0.970 | ---- | 0.991 |
| Refractive index (D-line) at 25° C | 1.4612 | 1.4574 | 1.4551 | 1.4555 |

Each was a water-white liquid with a pleasant, fragrant odor of interest as a constituent of perfume bases. Some of the esters have been found useful as softeners in plastic compositions.

We claim:

1. As a new chemical compound, a material selected from the group consisting of (A) the monocarboxylic acid, $C_{10}H_{16}O_2$, melting at 49.3–49.5° C. and distilling at about 160° C. at 14–15 millimeters of mercury, absolute pressure, produced by heating hydroxy - tetrahydro - nor - dicyclopentadiene with a fused alkali metal hydroxide at a temperature in the range from 275° to 375° C., and (B) esters of said acid, wherein the esterifying radical is selected from the class consisting of lower alkyl groups and lower alkyloxyalkyl groups, the number of carbon atoms in each such alkyl group being from 1 to 4, inclusive.

2. The monocarboxylic acid, $C_{10}H_{16}O_2$, melting at 49.3–49.5° C. and distilling at about 160° C. at 14–15 millimeters of mercury, absolute pressure, produced by heating hydroxy-tetrahydro-nor-dicyclopentadiene with a fused alkali metal hydroxide at a temperature in the range from 275° to 375° C.

3. The methyl ester of the acid claimed in claim 2, boiling at 102° C. at 10 millimeters, having a density of about 0.990 and a refractive index of 1.4612 at 25° C.

4. The ethyl ester of the acid claimed in claim 2, boiling at 109° C. at 8 millimeters, having a density of 0.970 and a refractive index of 1.4574 at 25° C.

5. The isobutyl ester of the acid claimed in claim 2, boiling at 118° at 4.5 millimeters and at 245° C. at 462 millimeters, and having a refractive index of 1.4551 at 25° C.

6. The methoxypropoxypropyl ester of the acid claimed in claim 2, boiling at 163° at 3 millimeters, having a density of about 0.991 and a refractive index of 1.4555 at 25° C.

EARL L. PELTON.
GLENN C. WIGGINS.
GERALD M. CORBETT.

REFERENCES CITED

The following references are of record in the file of this patent:

UNITED STATES PATENTS

| Number | Name | Date |
|---|---|---|
| 2,010,692 | Grether et al. | Aug. 6, 1935 |
| 2,427,344 | Bain | Sept. 16, 1947 |

OTHER REFERENCES

Bruson, J. A. C. S., vol. 67, pp. 723–728 (1945).